Oct. 21, 1952 R. A. EDWARDS 2,615,127

ELECTRONIC COMPARATOR DEVICE

Filed Sept. 17, 1949 2 SHEETS—SHEET 1

55 TO 62 INCLUSIVE ARE TWO STATE SWITCHING UNITS

Inventor:
Robert A. Edwards,
by Claude H. Mott
His Attorney.

Inventor:
Robert A. Edwards,
by Claude A. Mott
His Attorney.

UNITED STATES PATENT OFFICE 2,615,127

ELECTRONIC COMPARATOR DEVICE

Robert A. Edwards, Schenectady, N. Y., assignor to General Electric Company, a corporation of New York Application September 17, 1949, Serial No. 116,311

10 Claims. (Cl. 250—27)

This invention relates to electronic comparator devices and more particularly to a high speed electronic comparator device for comparing numbers of the same radix and for developing an output voltage signal which can be used for control purposes when two numbers being compared are identical.

Such a device is useful and is intended for employment in an electronic digital computer or other electronic apparatus whenever the necessity for comparing two numbers of the same radix arises. For example, in electronic counters it may be desirable to stop a machine after a predetermined count of say 1000, has been reached. This is possible if a device is provided to compare the predetermined count number with a series of numbers successively appearing in the counter as the counting progresses and also capable of transmitting a signal to stop the operation of a machine in response to the comparison of identical numbers. In another case, a comparator may be used as a simple method of searching for a particular number if means is provided to indicate the comparison of identical numbers when one given predeterminable number is being compared with a variable series of successive numbers.

It is an object of this invention to provide a simple electronic device, reliable in operation, for high speed comparison of binary numbers.

A further object is to provide a simple electronic device for comparing a given binary number of one or more digits with a series of binary numbers to determine which, if any, of the series of numbers is identical to the given number.

Another object is to provide an electronic device which in addition to providing a high speed comparison of a given binary number with a series of binary numbers is capable also of developing an output voltage signal when two numbers being compared are identical.

It is also an object of this invention to provide a simple electronic device, reliable in operation, for high speed comparison of numbers of the same radix in any system of numbers.

A further object is to provide a simple electronic device for comparing a given number of one or more digits and any radix with a series of numbers of the same radix to determine which, if any, of the series of numbers is identical to the given number.

A still further object is to provide an electronic device which, in addition to providing a high speed comparison of a given number of any radix with a series of numbers of the same radix, is capable of developing an output voltage signal when two numbers being compared are identical.

In general, my invention comprises the selective grouping of grid biased electronic tubes to cooperate with multiple state switching units and suitable resistor and optionally employed inverter means to provide a comparison of numbers of any common radix one with the other.

Figure 2:
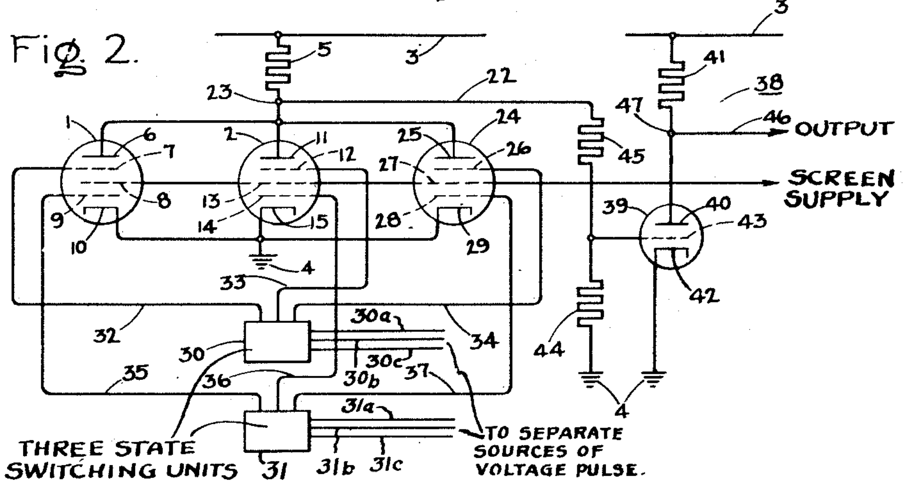
Figure 3:
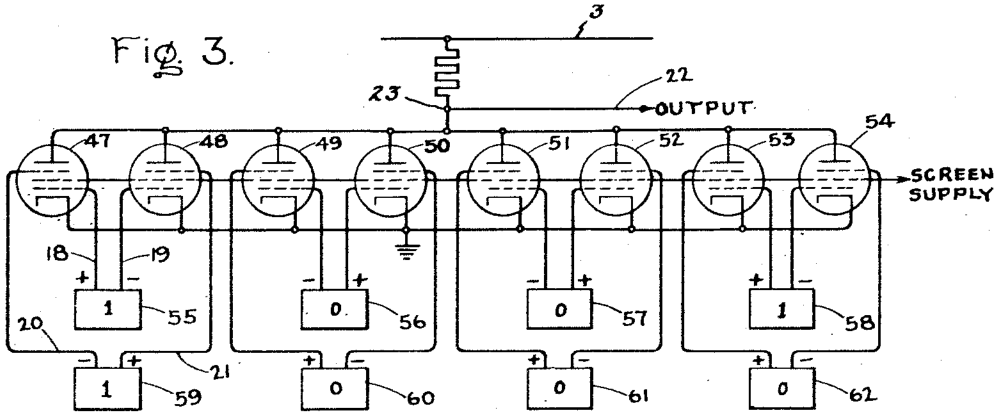
Figure 4:
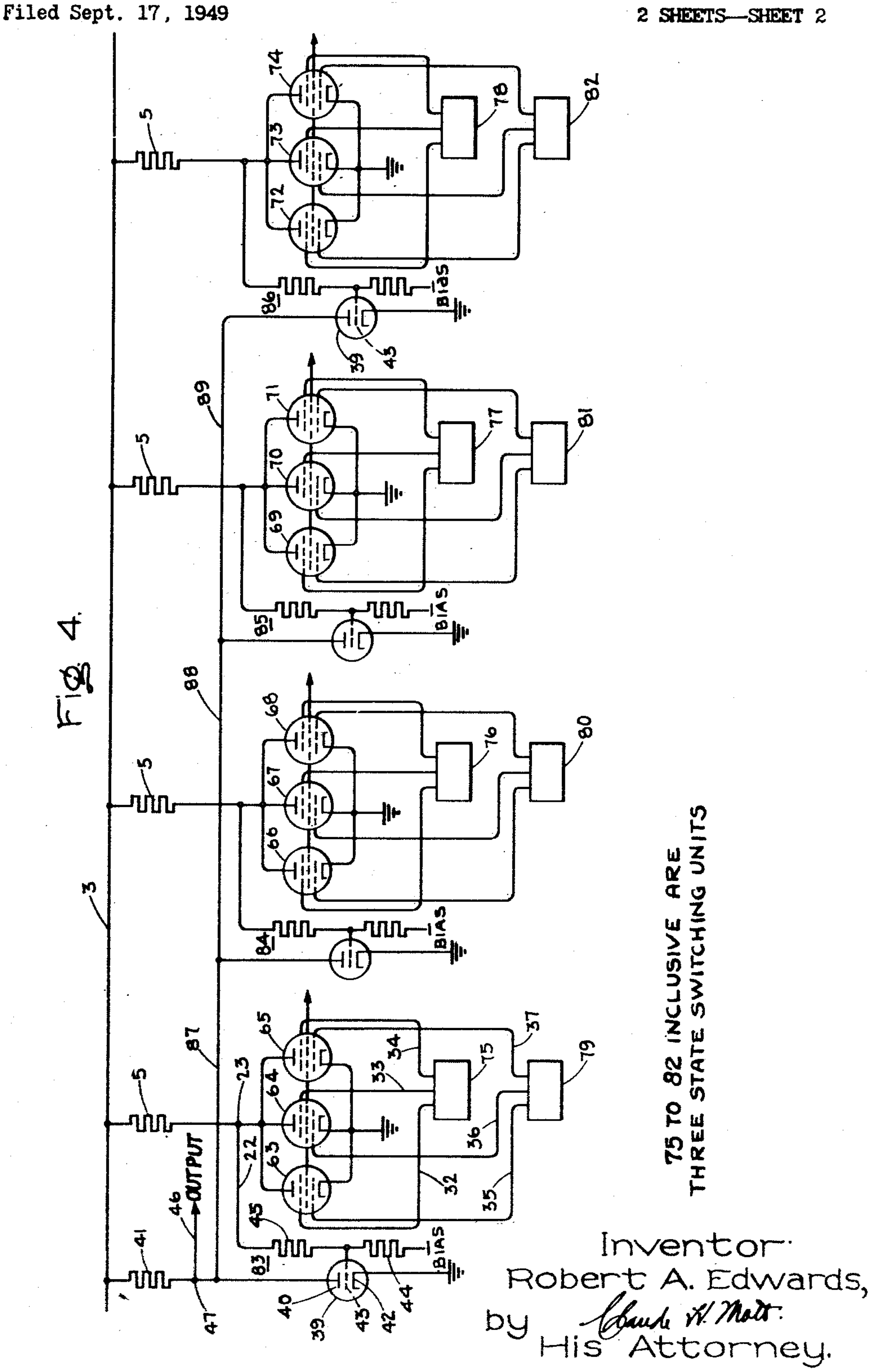

For a complete understanding of my invention, reference should be had to the following specifications and the accompanying drawings in which like elements are given the same character reference. In the drawings, Fig. 1 is a diagrammatical view of a circuit illustrative of one aspect of my invention, Fig. 2 is a diagrammatical view of a circuit showing a modification of my invention illustrative of a second aspect thereof, and Fig. 3 is a diagrammatical view of a circuit showing a further modification of my invention illustrative of a third aspect thereof, and Fig. 4 is a diagrammatical view of a circuit showing a still further modification of my invention.

Figure 1:
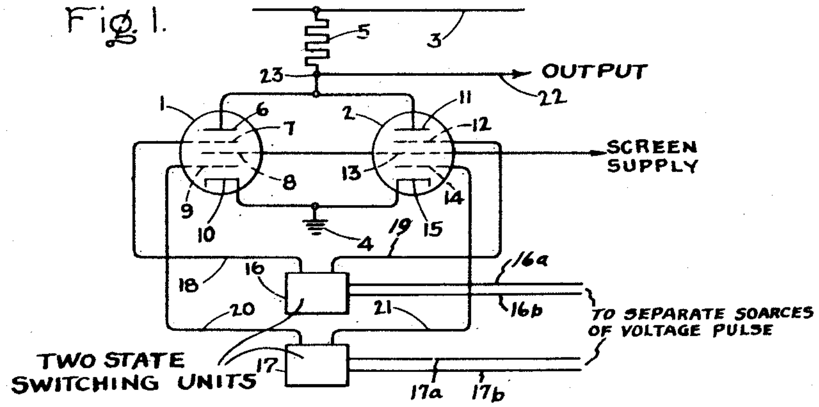

Referring to the drawings, in Fig. 1 I have shown two associated electronic tubes 1 and 2 electrically connected to a source of voltage supply indicated by a positive conductor 3 and a ground 4 through a common plate resistor 5. Each of the electronic tubes comprise an anode, a first control grid, a screen grid, a second control grid and a cathode which I have numbered respectively in the two tubes 1 and 2 as 6–10 and 11–15.

Those skilled in the art will understand that in contrast to the common decimal system using a radix 10 and comprising the characters 1–9 and 0, in the binary system using a radix 2 the characters are either 0 or 1. Therefore, the total number of characters being 2 in a binary number such characters may be represented respectively by one position or the other of a double voltage output two state unit. Such a unit may be a single pole double throw switch, or a conventionally termed flip-flop circuit, or any of a number of other two state units in which the output voltages may be alternately reversed to indicate one or the other of the binary characters. The particular two state units used to represent the characters of the binary system is not important to my invention as any such device may be used.

In accordance with one aspect of my invention for the comparison of numbers in the binary system, I provide two such units, numbered 16 and 17 in Fig. 1, with each pair of electronic tubes, as, for example, with tubes 1 and 2. The units 16 and 17 are assumed to be conventional flip-flop circuits having respective outputs 18 and 19 and 20 and 21 which are electrically connected respectively to the control grids 7, 12, 9 and 14 of the electronic tubes 1 and 2. The electronic tubes 1 and 2 are arranged to be conductive only when both control grids of the particular tube are impressed with a positive voltage. That is, for tube 1 to become conductive, the outputs 18 and 20 of respective units 16 and 17 must be positive, and for tube 2 to be conductive, the outputs 19 and 21 of units 16 and 17 must both be positive.

Assuming that it is desired to compare a binary character stored in unit 16 with a series of binary characters being successively stored in unit 17, this may be done by arranging unit 16 to produce a positive voltage on its output 18 and a negative voltage on its output 19 when the character 0 is stored therein. In contrast, unit 17 may be arranged to have a negative voltage on its output 20 and a positive voltage on its output 21 for the storage of the character 0 therein and the reverse voltages for the storage of the character 1. Those skilled in the art will understand that the arrangements above described may be produced by energizing the units 16 and 17 from separate sources of voltage pulse indicated through the respective inputs 16*a* and 16*b* and 17*a* and 17*b*. Inputs 16*a* and 17*a* are number inputs through which voltage pulses may be introduced to the respective units 16 and 17 to represent therein the binary character 1, and inputs 16*b* and 17*b* are reset inputs through which a voltage pulse may be introduced to the respective units 16 and 17 to represent therein the binary character 0. A flip-flop circuit which may be applied to represent the binary characters 0 and 1 by the relation of positive and negative voltages from the anode outputs thereof is disclosed in my copending application Serial No. 123,700, filed October 26, 1949, for a Calculating Device and assigned to the same assignee as the present invention.

With such an arrangement of voltages representing the characters 0 and 1 in the units 16 and 17 assume, for example that the character 0 is stored in unit 16 by a voltage pulse received through input 16*b* and that the character 1 appears in unit 17 by a voltage pulse produced on input 17*a*. In such case, the character 1 in unit 17 is not identical to the character 0 in unit 16 and such fact is indicated by a drop in voltage in an output line 22 electrically connected at a point 23 electrically between the resistor 5 and the anode plates 6 and 11. Such drop in voltage is developed by current drawn through the common plate resistor 5 by tube 1 which becomes conductive because both grids 7 and 9 are supplied with positive voltage. That is, for a 0 in unit 16 its output 18 is positive and for 1 in unit 17 its output 20 is positive. Outputs 18 and 20 being connected respectively to grids 7 and 9 of tube 1 and being both positive therefore cause tube 1 to become conductive. Tube 2 remains inoperative because its grids 11 and 14 are supplied with a negative voltage.

Next, assume that in place of the 1 in unit 17 an 0 is inserted therein by a pulse through input 17*b*. In this case the characters in units 16 and 17 are identical and such fact is indicated by the potential of conductor 22 rising to that of source 3. That is, in this case, neither tube 1 nor 2 becomes conductive because each tube has one negatively biased grid, namely, grid 9 in tube 1 and grid 12 in tube 2. Therefore the raising of the voltage of conductor 22 to the potential of source 3 may be used as a means indicating that the digital characters compared in units 16 and 17 are identical. Moreover, from the above it will be apparent to those skilled in the art that such a rise in voltage of conductor 22 may also be employed to develop an output voltage signal thereby permitting the transfer of such number to another portion of a computer machine.

Therefore, in accordance with the first aspect of my invention, I have provided a device for comparing one digital character of a binary number with a series of corresponding digital characters of a series of binary numbers to determine which, if any, of the corresponding digits are identical. Moreover, I have provided a means for transmitting a voltage signal responsive to an identity of two digits being compared which signal may be used as a control means for another machine.

In a second aspect of my invention, by modification of the arrangement described above, it is possible to compare two corresponding digits of numbers in any of the number systems providing such numbers have a common radix. For example, if it is desired to compare a digit of a number having a radix 3 with the corresponding digits of a series of numbers also having a radix 3 such a comparison is possible by providing a device of which Fig. 2 is illustrative. In the device shown in Fig. 2, an additional electronic tube 24 is electrically connected in parallel with the tubes 1 and 2 previously referred to in Fig. 1 to form a group of three tubes electrically connected to the potential source indicated by 3 and 4 through the common plate resistor 5. Tube 24 is provided with an anode 25, a first control grid 26, a screen grid 27, a second control grid 28 and a cathode 29. In place of the two state units 16 and 17 employed for comparison of binary numbers, three state units 30 and 31 having 3 outputs 32—34 and 35—37 respectively are employed in a device for comparing numbers having a radix 3. Any conventional switching unit may be employed for the three state units. For example, such a unit may comprise a pair of conventional flip-flop circuits electrically connected to a matrix to produce three outputs one positive and two negative, the unit 30 being actuated from separate sources of voltage pulse indicated through respective inputs 30*a*, 30*b*, and 30*c* and the unit 31 being actuated through respective inputs 31*a*, 31*b* and 31*c* to represent in each unit the desired radix 3 character 0, 1 or 2. For convenience, inputs 30*a* and 31*a* are assumed to be the zero's inputs, 30*b* and 31*b* the one's inputs and 30*c* and 31*c* the two's inputs.

Also in this second aspect of my invention, I provide a voltage inverter member 38 comprising a grid biased electronic tube 39 having an anode plate 40 connected to the source of positive potential 3 through an anode plate resistor 41, a cathode 42 electrically connected to the ground 4, and a control grid 43 electrically connected to ground 4 through a ground resistor 44 and to output conductor 22 through a resistor 45. A second output conductor 46 is electrically connected at a point 47 electrically positioned between resistor 41 and anode 40 of tube 39. This second mentioned device for comparing numbers of radix 3, in operation, is similar to the device described for the binary system except for the employment of the voltage inverter member 38.

For example, the three characters in the radix 3 system being represented by 0, 1 and 2, assume, that for units 30 and 31 to represent 0, outputs 32 and 35 are positive, outputs 33 and 36 negative, and outputs 34 and 37 negative. In such case, when a 0 is stored in unit 30 by a pulse received through input 30*a* and 0 appears in unit 31 by a voltage pulse produced in input 31*a*, tube 1 becomes conductive, its control grids being impressed with positive voltages, and the voltage in output 22 is reduced below the voltage of source 3. By reducing the voltage level of output 22 the voltage applied to control grid 43 of tube 39 through resistor 45 is made sufficiently negative to prevent conduction in tube 39. Therefore, since no current is drawn through resistor 41 when tube 39 is in a non-conductive condition, the voltage at output 46 is maintained at the level of voltage source 3. This voltage level of output 46 is used to indicate that the two equivalent digits of the numbers being compared are identical and may also be used to develop an output voltage signal. Next, assume that the radix 3 character 1 appears in the unit 31 by a voltage pulse on input 31*b* in place of the 0 previously stored therein. This may be indicated by the relation of voltages from unit 31 as output 35 negative, output 36 positive, and output 37 negative. In this case, none of the tubes 1, 2 or 24 become conductive because at least one grid of each is impressed with a negative voltage. The same is true if the character 2 is made to appear in unit 31 by a voltage pulse on input 31*c* the character 2 being represented by output 35 negative, output 36 negative, and output 37 positive. Therefore, where the digit character stored in unit 30 is not identical to the digit character appearing in unit 31, the voltage of output 46 of tube 39 is lower than the voltage of source 3 and no indication of identity of digits appears.

Therefore, by correspondingly increasing the number of tubes and the number of outputs or states of the switching units to represent the digit characters of numbers having a particular radix in common, and by adding a voltage inverter member, corresponding digits of numbers having any common radix may be compared one with the other or a digit of a given number may be compared with corresponding digits of a series of numbers having the same radix as the given number. Moreover, a voltage signal responsive to the comparison of identical digits is provided on output conductor 46 which may be used as a control means for another machine or for any other suitable purpose.

To carry my invention one step further to a third aspect thereof, it will be evident that a plurality of associated groups of electronic tubes may be electrically interconnected and electrically connected to a source of voltage supply through a common plate resistor and, thereby, in cooperation with an equal number of pairs of switching units, having the same number of outputs as the number of tubes in each associated group of tubes, provide a means for comparing complete numbers of identical radix one with the other. For example, such a device, as shown in Fig. 3, may have four pairs of associated tubes represented by numbers 47—54 and four pairs of two state double output units as represented by numbers 55—62. It should be noted at this point that units 55—62 are identical to units 16 and 17 previously described and that for simplicity of the drawing the inputs have not been shown. With such an arrangement it is then possible to compare two complete binary numbers of four digit lengths one with the other. To do this, the units 55—58 may be arranged as previously described with respect to units 16 and 17 to produce negative voltage on their outputs 18 and positive voltage on their outputs 19 when the binary character 0 is stored therein and the reverse output voltages when the binary character 1 is stored therein. In such case, for a number, say 1001, stored in the units 55—58 the voltage of outputs 18 and 19 thereof are positive and negative as indicated in Fig. 3. In contrast for units 59—62 such units may be arranged to have a positive output voltage on lines 20 and a negative output voltage on lines 21 for the storage of a 0 binary character in each of the units and the reverse voltage relation for the storage of binary character 1. Thus, for a number, say 1000, appearing in units 59—62 the voltages of the outputs 20 and 21 thereof are positive or negative as indicated in Fig. 3. In considering the effect of such output voltages of units 55—62 on the pairs of electronic tubes 47—54 it is evident that neither of the tubes 47 or 48 become conductive because there is a negative voltage on one grid of each tube. The same is true for the pairs of tubes 49 and 50 and 51 and 52. However, in tubes 53 and 54 tube 53 has a positive bias on both of its grids and therefore becomes conductive. Thus, the voltage on output conductor 22 is made lower than the voltage of source 3 by reason of the current drawn through tube 53 thereby indicating that the two binary numbers compared are not identical. If the binary number 1001 appears in units 59—62 then none of the electronic tubes becomes conductive because there is a negative voltage on one grid of each tube, and the voltage of output conductor 22 is therefore maintained at the voltage of source 3 thus indicating identity of the numbers compared.

A series of binary numbers may thus be processed through the units 59—62 to be compared to the binary number stored in the units 55—58 to determine which, if any, of the numbers processed are identical with the stored number and for developing an output voltage signal on output conductor 22. Moreover, by increasing the number of pairs of tubes and units, binary numbers of any length may be processed and compared by this device.

If it is desirable to compare two complete numbers of some radix other than 2, the number of tubes are increased and electrically connected in groups of tubes each group having tubes equivalent in number to the radix of the particular number system, the number of outputs of each unit of the pair of associated switching units operating with each group of tubes is increased to correspond to the number of tubes in each group of tubes, a voltage inverter member is added for each group of tubes, and the voltage inverter members are connected through a common resistor to a source of positive voltage.

For example, the circuit shown in Fig. 4 is illustrative of the application of my invention to four digit numbers of radix 3. In Figure 4 a plurality of multigrid electronic tubes 63—74 are electrically interconnected in groups of three corresponding to the radix 3 and each group of tubes is electrically connected, as previously described with reference to Fig. 2, to a pair of three state switching units and to a voltage inverter circuit. In Fig. 4 the switching units are represented by the numbers 75—82 and the voltage inverter circuits by numbers 83—86. The switching units 75—82 are identical to switching units 30 and 31 previously described and the voltage inverter circuits 83—86 are identical to the voltage inverter circuit 38 also previously described. The inputs to the switching units 75—82 have been omitted to simplify the drawing. The anodes 40 of the tubes 39 of the inverter circuits 83—86 are electrically interconnected by conductors 87—89 as shown in Fig. 4 and are electrically connected to positive voltage source 3 through the common resistor 41 to cause current to be drawn through resistor 41 in response to the establishment of a conductive condition in any of the tubes 39 of the inverter circuits 83—86. Such current drawn through the common resistor 41 reduces the voltage on output conductor 46 of the inverter circuits to indicate a lack of identity of the numbers being compared. That is, in operation, assume that in the switching units 75—78 the character 0 is represented by output conductors 32 positive, 33 negative and 34 negative, the character 1 by output conductor 32 negative, 33 positive and 34 negative, and the character 2 by output conductors 32 negative, 33 negative and 34 positive. Assume further that in the switching units 79—82 the character 0 is represented by output conductors 35 positive, 36 negative and 37 negative, the character 1 by outputs 35 negative, 36 positive, and 37 negative, and the character 2 by outputs 35 negative, 36 negative and 37 positive. Then if the radix 3 number 1001 is stored in units 75—78 and the radix 3 number 1002 is stored in units 79—82, one tube in each of the first three groups of tubes will become conductive, that is, of tubes 63—65 tube 64 is conductive, of tubes 66—68 tube 66 is conductive, and of tubes 69—71 tube 69 is conductive. Thus the voltage on the grid 43 of the tubes 39 of each of the inverter circuits 83—85 is lowered to prevent operation of that tube and therefore no current is drawn through the common anode resistor 41 as the result of operation of inverters 83—85. However, in the group of tubes 72—74 none of the tubes are in conductive condition because a negative voltage is applied to one grid of each tube on this group. Therefore, the voltage applied to grid 43 of tube 39 in the inverter circuit 86 is sufficiently high to cause the conduction in tube 39 of inverter circuit 86 and current is drawn through the common anode plate resistor 41 decreasing the voltage on output conductor 46 thereby indicating a lack of identity of the radix 3 numbers being compared. By changing the number in switching units 79—82 to the radix 3 number 1001 corresponding to the number stored in the switching unit 75—78, tube 73 becomes conductive thereby preventing the operation of the tube 39 of inverter circuit 86 and maintaining the voltage of output conductor 46 at the voltage level of source 3. Thus, an indication is given that the four-digit radix 3 numbers being compared are identical and means is provided for developing a voltage signal on output conductor 46.

The voltage inverter members may also be employed in a device comparing binary numbers, if desired, but since this is not necessary to a satisfactory operation of such device, they are preferably not employed.

Therefore, in accordance with my invention, I have provided a high speed electronic comparator device capable of comparing complete numbers having any radix in common to indicate an identity or lack of identity of the numbers being compared.

Also in my invention, means is provided for rapidly comparing one number of a given radix with a series of numbers of the same radix to determine which, if any, of the numbers are identical.

Such a device is highly advantageous in a high speed search for a particular number in a large quantity of numbers, and has the additional advantage of being capable of construction for searching in any of the number systems.

The device may also be used to operate a machine in response to a predetermined count. For example, in a machine for loading, say pills, in a bottle, it may be desirable to stop the machine after a predetermined count. This can be accomplished by my device by placing a number corresponding to the predetermined count in one of the groups of switching units and pulsing or otherwise motivating the other group of switching units by means of an electric eye or other suitable device to record the count as it progresses. When the count corresponds to the given number, the machine will then receive a signal from the comparator device indicating an identity of numbers and the machine will thereby be stopped.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A high speed device for comparing numbers having a common radix and for developing an output voltage signal in response to the comparison of two identical numbers comprising a plurality of grid biased electronic tubes, an anode plate in each of said tubes, said electronic tubes being divided into associated groups for comparing respectively corresponding digits of said numbers, connections for connecting each of said tubes in each group to a source of voltage potential through an anode plate resistor common to that group, a voltage inverter means for each of said groups of tubes, each inverter means being electrically connected to the anodes of its group of tubes, resistor means common to said plurality of voltage inverter means, connections for connecting said plurality of voltage inverter means to a source of positive voltage through said common resistor means, an output voltage means connected to said resistor means, and means for varying the voltages on the grids of said groups of tubes in a pretetermined relation with corresponding digits of said numbers to obtain a predetermined voltage value in said output voltage means in response to an identity of two numbers being compared one with the other.

2. In combination, associated groups of grid biased electronic tubes, an anode plate in each of said tubes, connections for connecting each of said tubes to a source of voltage potential through an anode plate resistor common to the associated group, a voltage inverter means for each of said groups of tubes, each inverter means being electrically connected to the anodes of its group of tubes, resistor means common to said plurality of voltage inverter means, connections for connecting said plurality of voltage inverter means to a source of positive voltage through said common resistor means, an output voltage means connected to said resistor means, and associated pairs of multistate switching units, each of said units having a number of voltage outputs corresponding to the number of tubes in each group of tubes, each pair of units being associated with a particular group of said tubes, said outputs of each unit being electrically connected in a predetermined order to a grid of each tube in its associated group of tubes, and said switching units being operable to vary the voltages on said grids of said groups of tubes in response to the operating positions of said switching units to control the output voltage in said output voltage means.

3. A device for comparing numbers having a common radix comprising associated groups of electronic tubes, an anode plate in each of said tubes, connections for connecting each of said tubes to a source of voltage potential through an anode plate resistor common to each of said associated groups, a voltage inverter means for each of said groups of tubes, each inverter means being electrically connected to the anodes of its group of tubes, resistor means common to said plurality of voltage inverter means, connections for connecting said plurality of voltage inverter means to a source of positive voltage through said common resistor means, an output voltage means connected to said resistor means, a first and second control grid in each of said tubes, means impressing voltages of predetermined values one on each of said first control grids to represent in each group of tubes the character of a particular digit of a given number, and means impressing voltages of predetermined values one on each of said second control grids to represent in each group of tubes the character of a particular digit of successive numbers to be compared to said given number, said tubes being operable in response to the voltages impressed on the control grids thereof to control the voltage of said output voltage means to provide a comparison of corresponding digits of said given number and each of said series of numbers to indicate an identity of two numbers being compared one with the other.

4. A high speed device for comparing binary numbers and for developing an output voltage signal in response to the comparison of two identical binary numbers comprising associated groups of grid biased electronic tubes, an anode plate in each of said tubes, connections for connecting each of said groups of tubes to a source of voltage potential through a common anode plate resistor, a common output voltage means electrically connected to the anodes of said tubes, and associated pairs of two state double output switching units, each pair of units being associated with a particular group of said tubes, said outputs of each unit being electrically connected in a predetermined order to a grid of each tube in its associated group of tubes and said switching units being operable to vary the voltages on the grids of said groups of tubes in a predetermined relation with corresponding digits of said numbers to obtain a predetermined voltage value in said output voltage means in response to an identity of two numbers being compared one with the other.

5. A high speed device for comparing binary numbers comprising associated groups of electronic tubes, an anode plate in each of said tubes, connections for electrically connecting each of said groups of tubes to a source of voltage potential through a common anode plate resistor, a first and a second control grid in each of said tubes, means impressing voltages of predetermined values one on each of said first control grids to represent in each group of tubes the character of a particular digit of a given binary number, and means impressing voltages of predetermined values one on each of said second control grids to represent in each group of tubes the character of a particular digit of successive binary numbers to be compared to said given binary number, said tubes being operable in response to the voltages impressed on the control grids thereof to provide a comparison of corresponding digits of said given binary number and each of said series of binary numbers to indicate by the anode plate voltage of said tubes an identity of two binary numbers being compared one with the other and to develop an output voltage signal.

6. A device for comparing a predeterminable number with a variable number and for indicating an identity thereof comprising a pair of multiple state units for each corresponding digit of the predeterminable and varying numbers to be compared, one of said multiple state units of each associated pair being provided for a digit of the predeterminable number and the other being provided for the corresponding digit of the varying number, the number of states of said multiple state units corresponding to the radix of the numbers being compared, a group of electronic tubes, corresponding in number to the radix of the numbers being compared, for each associated pair of said multiple state units, each of said tubes having two control grids either of which is capable of preventing tube conduction, connected respectively to the two multiple state units of the associated pair, each of said multiple state units being capable of indicating the state thereof by application of a voltage to the connected grid of one of said tubes different from that applied to the connected grid of each of the remainder of said tubes whereby the states of said two multiple state units in each associated pair may be compared in terms of the control by said grids of conduction in said group of electronic tubes, an anode resistor connected in common with the anodes of the tubes of a group and in series with their anode voltage supply for indicating the presence or absence of conduction in any of the tubes of said connected group in terms of a voltage drop thereacross, a voltage inverter connected to said anode resistor of a connected group of tubes for conduction in response to the voltage thereacross, and an inverter resistor interconnected with said inverter of a connected group of tubes for indicating inverter conduction in terms of a voltage drop thereacross.

7. A device for comparing a predeterminable number with a variable number and for indicating an identity thereof comprising a pair of multiple state units for each corresponding digit of the predeterminable and varying numbers to be compared, one of said multiple state units of each associated pair being provided for a digit of the predeterminable number and the other being provided for the corresponding digit of the varying number, the number of states of said multiple state units corresponding to the radix of the numbers being compared, a group of electronic tubes, corresponding in number to the radix of the numbers being compared, for each pair of said multiple state units, each of said tubes having two control grids either of which is capable of preventing tube conduction, connected respectively to the two multiple state units of the associated pair for said group of tubes, each of said multiple state units being capable of indicating the state thereof by application of a voltage to the connected grid of one of said tubes of said group different from that applied to the connected grid of each of the remainder of said tubes of said group whereby the states of said two multiple state units in each associated pair may be compared in terms of the control by said grids of conduction in said electronic tubes of said group, and an anode resistor connected in common with the anodes of the tubes of said group and in series with their anode voltage supply for indicating the presence or absence of conduction in any of the tubes in the connected group in terms of a voltage drop thereacross.

8. A device for comparing a predeterminable number with a variable number and for indicating an identity thereof comprising a pair of multiple state units for each corresponding digit of the predeterminable and varying numbers to be compared, one of said multiple state units of each associated pair being provided for a digit of the predeterminable number and the other being provided for the corresponding digit of the varying number, the number of states of said multiple state units corresponding to the radix of the numbers being compared, a group of electronic tubes, corresponding in number to the radix of the numbers being compared, for each associated pair of said multiple state units, each of said tubes of a group having two control grids, either of which is capable of preventing tube conduction, connected respectively to the associated pair of multiple state units for said group of tubes, each of said multiple state units being capable of indicating the state thereof by application of a voltage to the connected grid of one of said tubes of said group different from that applied to the connected grid of each of the remainder of said tubes of said group whereby the states of said two multiple state units of each associated pair may be compared in terms of the control by said grids of conduction in said group of electronic tubes for said associated pair.

9. A device for comparing a predeterminable binary number with a variable binary number and for indicating an identity thereof comprising a pair of two state units for each corresponding digit of the predeterminable and varying numbers to be compared, one of said two state units of an associated pair being provided for a digit of the predeterminable number and the other being provided for the corresponding digit of the varying number, and two electronic tubes, each having two control grids, either of which is capable of preventing tube conduction connected respectively to the two state units of an associated pair, each of said two state units being capable of indicating the state thereof by application of a positive voltage to the connected grid of one of said tubes and a negative voltage to the connected grid of the other of said tubes whereby the states of said two state units of said associated pair may be compared in terms of the control by said grids of conduction in said electronic tubes.

10. A device for comparing a predeterminable binary number with a variable binary number and for indicating an identity thereof comprising a pair of two state units for each corresponding digit of the predeterminable and varying numbers to be compared, one of said two state units of each associated pair being provided for a digit of the predeterminable number and the other being provided for the corresponding digit of the varying number, a group of two electronic tubes, each having two control grids either of which is capable of preventing tube conduction, connected respectively to each associated pair of said two state units, each of said two state units being capable of indicating the state thereof by application of a positive voltage to the connected grid of one of said tubes and a negative voltage to the connected grid of the other of said tubes whereby the states of said two state units of an associated pair may be compared in terms of the control by said grids of conduction in said electronic tubes, an identity between the two numbers being indicated by non-conduction of each tube of a group, and an anode resistor connected in common with the anodes of the tubes of a group and in series with their anode voltage supply for indicating the presence or absence of conduction in any of the tubes in the connected group in terms of a voltage drop thereacross.

ROBERT A. EDWARDS.

REFERENCES CITED

The following references are of record in the file of this patent:

UNITED STATES PATENTS

| Number | Name | Date |
|---|---|---|
| 2,425,131 | Snyder | Aug. 5, 1947 |
| 2,438,588 | Tolson | Mar. 30, 1948 |
| 2,484,081 | Dickenson | Oct. 11, 1949 |
| 2,515,668 | Schock et al. | July 18, 1950 |

OTHER REFERENCES

"A Magnetic Digital Storage System," Booth Electronic Engineering, July, 1949 (pgs. 234–238).

"A Storage System for Use with Binary Digital Computing Machines," Williams et al. Ire Proceedings, Part III, March, 1949 (pgs. 81–96).